(12) United States Patent
Breau et al.

(10) Patent No.: US 8,254,305 B1
(45) Date of Patent: Aug. 28, 2012

(54) SYSTEM AND METHOD FOR BRIDGING MEDIA LOCAL AREA NETWORKS

(75) Inventors: Jeremy R. Breau, Leawood, KS (US); Jason R. Delker, Olathe, KS (US); Manish Mangal, Overland Park, KS (US); Mathew Oommen, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 335 days.

(21) Appl. No.: 12/689,081

(22) Filed: Jan. 18, 2010

(51) Int. Cl.
*H04B 7/14* (2006.01)
*G06F 15/16* (2006.01)

(52) U.S. Cl. .......................... 370/315; 709/231

(58) Field of Classification Search ............. 370/310, 370/315, 328, 338; 709/220, 223, 230, 231
See application file for complete search history.

(56) References Cited

U.S. PATENT DOCUMENTS

| | | | |
|---|---|---|---|
| 7,929,538 B2 * | 4/2011 | Gobara et al. ............... | 370/392 |
| 2006/0245403 A1 * | 11/2006 | Kumar ........................... | 370/338 |
| 2007/0211734 A1 | 9/2007 | Yang et al. | |
| 2008/0126550 A1 * | 5/2008 | Yasuma ........................ | 709/229 |
| 2008/0235358 A1 * | 9/2008 | Moribe et al. ............... | 709/220 |
| 2010/0211665 A1 * | 8/2010 | Raza et al. ................... | 709/223 |
| 2011/0179184 A1 | 7/2011 | Breau et al. | |
| 2011/0270680 A1 | 11/2011 | Lim | |

OTHER PUBLICATIONS

Breau, Jeremy R., et al., Patent Application entitled "Femtocell Bridging in Media Local Area Networks," filed on Jun. 1, 2010, U.S. Appl. No. 12/791,859.

"Address Resolution Protocol," Wikipedia, http://en.wikipedia.org/w/index.php?title=Address_Resolution_Protocol&printable=yes, (last visited Aug. 25, 2009).

Bahlmann, Bruce, "DLNA Basics, Bridging Services within a Connected Home," Communications Technology, http://www.cable360.net/print/ct/deployment/techtrends/23787.html, Jun. 1, 2007.

Bahlmann, Bruce, "Digital Living Network Alliance (DLNA) Essentials," Birds-Eye.Net, http://www.birds-eye.net/article_archive/digital _living_network_alliance_dlna_essentials.htm, Apr. 1, 2007.

"Network address translation," Wikipedia, http://en.wikipedia.org/w/index.php?title=Network_address_translation&printable=yes, Aug. 20, 2009.

Pre-Interview Communication dated Jun. 5, 2012, U.S. Appl. No. 12/791,859, filed on Jun. 1, 2010.

* cited by examiner

*Primary Examiner* — Chi Pham
*Assistant Examiner* — Robert Lopata

(57) ABSTRACT

A system is provided comprising a first bridging device associated with a first internet protocol (IP) address having a radio transceiver receiving simple service discovery protocol (SSDP) messages from devices on a first media local area network (LAN), encapsulates and transmits the messages to a second address. The system also comprises a server associated with the second address receiving the messages from the first bridging device. Based on the messages, the server constructs a list of the devices on the first network. Based on a rule, the server forwards at least some of the messages received from the first bridging device to a third address. The system also comprises a second bridging device associated with the third address with a transceiver that receives the messages forwarded to the third address, decapsulates the simple service discovery messages, and wirelessly broadcasts the messages to devices on a second media local area network.

20 Claims, 5 Drawing Sheets

SYSTEM AND METHOD FOR BRIDGING MEDIA LOCAL AREA NETWORKS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Electronic devices may use the simple service discovery protocol (SSDP) to announce their presence and exchange messages with other devices on their local networks. The simple service discovery protocol is a multicast protocol and may be used by consumer devices operating under universal plug and play (UPnP) conventions. Mobile and stationary consumer devices may be used in home networks. For example, a computer storing media may send photographs to a picture frame device for display. Devices may use the simple service discovery protocol to multicast their identity, their device type, their functionality, and their availability. Devices may multicast video files, audio files, and digital picture files for sharing with other devices in the local network. Devices also use the simple service discovery protocol to discover and communicate with supporting peripheral devices on their own networks such as printers and storage devices. The simple service discovery protocol also promotes interoperability and content sharing between devices in a home network. The simple service discovery protocol may extend the communications capabilities of the television and other traditionally passive consumer home devices to interoperate with computers and other media sharing devices.

SUMMARY

In an embodiment, a system is provided. The system comprises a first bridging device associated with a first internet protocol (IP) address having a radio transceiver that receives simple service discovery protocol (SSDP) messages from a plurality of devices on a first media local area network (LAN), encapsulates the simple service discovery protocol messages in messages directed to a second internet protocol address, and transmits the messages. The system also comprises a server associated with the second internet protocol address that receives the messages from the first bridging device. Based on the messages received from the first bridging device, the server also constructs a list of the plurality of devices on the first media local area network. Based on a first filtering rule configured into the server, the server also forwards at least some of the messages received from the first bridging device to a third internet protocol address. The system also comprises a second bridging device associated with the third internet protocol address having a radio transceiver that receives the messages forwarded by the server to the third internet protocol address, decapsulates the simple service discovery messages encapsulated in the messages forwarded by the server, and wirelessly broadcasts the simple service discovery protocol messages to a plurality of devices on a second media local area network.

In an embodiment, a processor-implemented method of coupling two media local area networks is provided. The method comprises a first gateway receiving a first multicast simple service discovery protocol (SSDP) message addressed to a single internet protocol address defined by a standard. The method also comprises the first gateway encapsulating the first multicast simple service discovery protocol message in a second message addressed to a second internet protocol address, where the second internet protocol address is different from the single internet protocol address defined by the standard. The method also comprises the first gateway transmitting the second message and a server receiving the second message. The method also comprises the server building a third message addressed to a third internet protocol address based on the second message and based on a map stored by the server that associates the first gateway with a second gateway. The method also comprises the server transmitting the third message and the second gateway receiving the third message. The method also comprises the second gateway decapsulating the first multicast simple service discovery protocol message from the third message and the second gateway transmitting the first multicast simple service discovery protocol message addressed to the single internet protocol address defined by the standard.

In an embodiment, a processor-implemented method of sharing content between local area networks is provided. The method comprises a server receiving a plurality of messages encapsulating simple service discovery protocol messages. The method also comprises the server inferring a structure of a first media local area network based on the plurality of messages encapsulating simple service discovery protocol messages, wherein inferring the structure of the first media local area network comprises identifying a plurality of devices coupled to the first media local area network based on identification information contained in the simple service discovery protocol messages. The method also comprises the server receiving a message to configure a tunnel between the first media local area network and a second media local area network for messages encapsulating a simple service discovery protocol message from a first device comprising the first media local area network. The method also comprises the server receiving and forwarding a message encapsulating a simple service discovery protocol message from the first device to the second media local area network.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
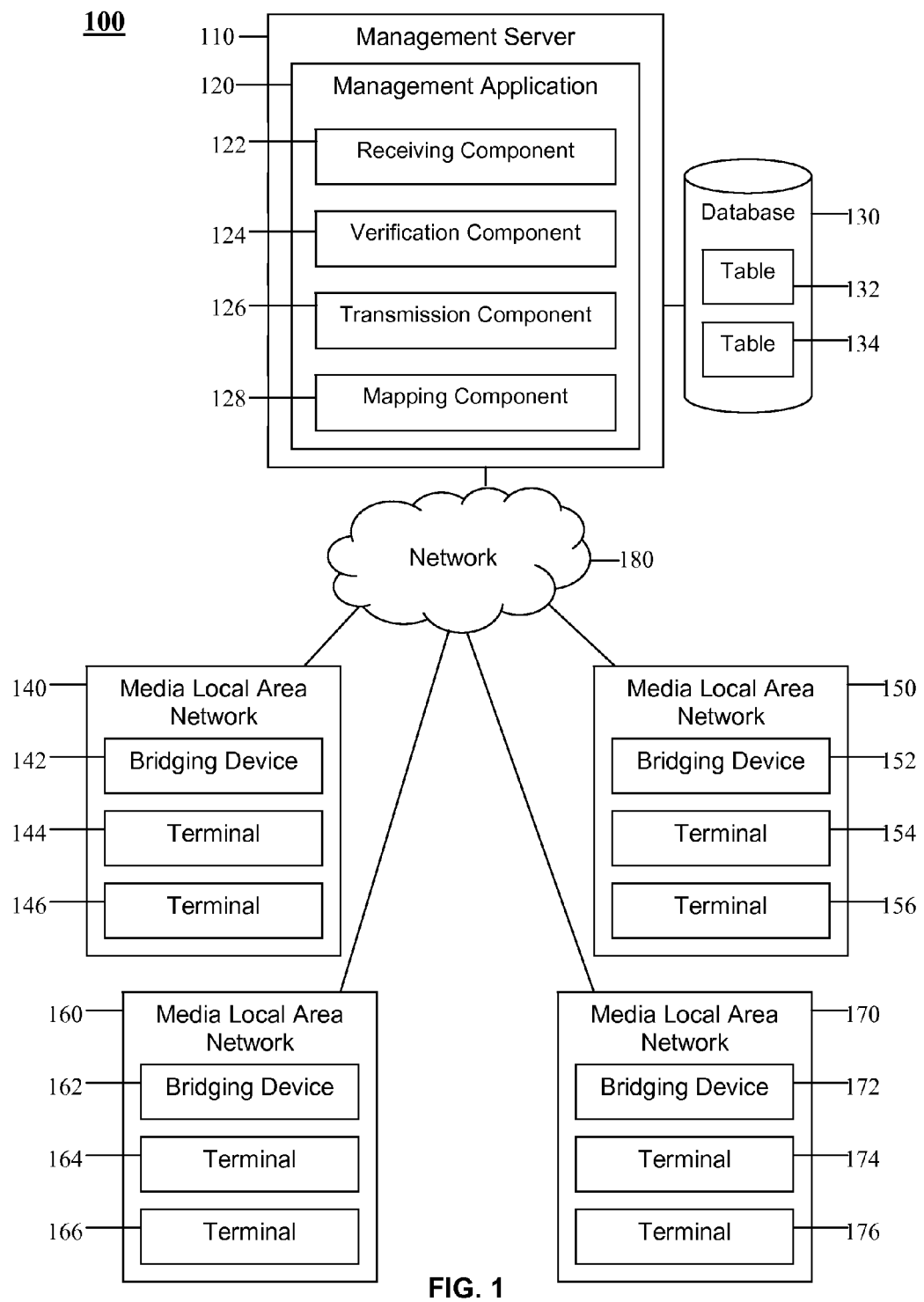
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

The present disclosure teaches a system and methods that promote communications between devices in separate networks, for example local area networks (LANs) that use the simple service discovery protocol. Consumer devices in a home network, for example, may communicate with each other using the simple service discovery protocol. Such devices may be unable to communicate with similar devices outside of their own network. Since the simple service discovery protocol only may be used within a closed network in a limited space, the present disclosure teaches that traffic between such devices residing in separate networks may be encapsulated in internet protocol packets for transmission between the networks.

The present disclosure teaches the use of a bridging device associated with each network, for example a local area network, to encapsulate simple service discovery protocol packets into internet protocol messages and to forward the messages to an external destination. In an embodiment, a bridging device receives multicast simple service discovery protocol messages from devices on its own local area network, encapsulates the messages into internet protocol messages, and forwards them to a management server outside of the local area network. Upon processing messages originating from a local area network, the management server may infer a structure or topology of the local area network including the identities, device types, and functionalities of individual devices located within the local area network. The management server may infer other information based on the interactions between devices in the local area network and interactions with devices on other local area networks. The management server consults stored information about the authorized exchange of data between local area networks. The management server may determine that devices on one local area network originating simple service discovery protocol messages are authorized to send messages containing data to a different local area network. After determining authorization, the management server encapsulates the messages from the originating local area network with the internet protocol address of the bridging device for the destination local area network and forwards the messages. When the destination bridging device receives the messages, it wirelessly multicasts the simple service discovery protocol content of the messages within its own local area network whereupon the intended recipient device takes possession of the message.

The management server may build a database describing authorized associations between different simple service discovery protocol networks. The management server also may use filtering rules when dealing with a plurality of sending and receiving networks. The management server may supplement the information in the database regarding authorizations based on inferred network structures. The present disclosure also teaches the management server providing an interface for use by administrators and other authorized parties to configure associations between different networks. An administrator may use the interface to configure persistent virtual tunnels between different networks.

Turning now to FIG. 1, a system 100 for bridging media local area networks is provided. The system 100 comprises a management server 110, a management application 120, a database 130, tables 132, 134, media local area networks 140, 150, 160, 170, bridging devices 142, 152, 162, 172, terminals 144, 146, 154, 156, 164, 166, 174, 176, and a network 180.

The management server 110 may be a computer system. Computer systems are discussed in greater detail hereinafter. The management server 110 may comprise one computer or a plurality of computers, for example, a server farm wherein many server computers cooperate to share a processing load. The management server 110 may comprise a plurality of computers that are located at different places, for example, to provide geographical diversity and increased service reliability. The management server 110 executes one or more applications including the management application 120.

The management application 120 executes on the management server 110 and receives a plurality of messages from bridging devices 142, 152 associated with media local area networks 140, 150. The messages contain data originated by terminals 144, 146, 154, 156 resident in the media local area networks 140, 150. The bridging devices 142, 152, 162, 172 forward the data encapsulated in internet protocol packets to the management server 110 whereupon the management application 120 determines if the packets should be forwarded or discarded. Terminals 144, 146, 154, 156 exchange data by multicast using the simple service discovery protocol, whether the terminals 144, 146, 154, 156 are located on the same or different media local area network 140, 150. Traffic using the simple service discovery protocol may be transmitted using the default multicast address of 239.255.255.250. However, the simple service discovery protocol only may be used to transmit traffic between terminals 144, 146 within a media local area network 140. Simple service discovery protocol traffic transmitted between terminals 144, 154 on different media local area networks 140, 150 may not pass without encapsulation into packets that use the internet protocol, at least in part because Internet routers may not route multicast packets so that the Internet is not flooded with multicast packets.

The address of 239.255.255.250 may be used as the default multicast address by media local area networks 140, 150, 160, 170. Terminals 144, 146, 154, 156, 164, 166, 174, 176 operating on media local area networks 140, 150, 160, 170 may be home or consumer devices. Such terminals 144, 146, 154, 156, 164, 166, 174, 176 and media local area networks 140, 150, 160, 170 may operate in compliance with the Digital Living Network Alliance (DLNA) standard used by manufacturers of consumer electronics to allow entertainment devices within the home to share their content with each other across a home network. The address of 239.255.255.250 may be commonly accepted as part of the Digital Living Network Alliance (DLNA) standard as the agreed or defined standard multicast address for home networks that may be media local area networks 140, 150, 160, 170. For further details about media local area networks 140, 150, 160, 170, bridging into media local area networks 140, 150, 160, 170 and/or bridging between media local area networks 140, 150, 160, 170, see U.S. patent application Ser. No. 12/689,121, filed Jan. 18, 2010, entitled "Integration of Remote Electronic Device with Media Local Area Network," by Jeremy R. Breau, et al., which is herein incorporated by reference.

Media local area networks 140, 150 may be self-contained and autonomous networks. The simple service discovery protocol traffic that is multicasted by terminals 144, 154 within the media local area networks 140, 150 is generally expected to remain within the media local area networks 140, 150 and be isolated from traffic originating from external devices. The multicast mode of communication of the simple service discovery protocol may be adverse to Internet communications that may take place using the internet protocol, outside of media local area networks, wherein specific internet protocol addresses may be designated. Routers and other devices that may be referred to as Layer 3 devices may block broadcast traffic and multicast traffic to avoid excess congestion of the Internet. For this reason, simple service discovery protocol packets passing between media local area networks 140, 150 are encapsulated by the gateway into internet protocol packets, which may be referred to as IP datagrams, and directed to specific internet protocol addresses. When the gateway encapsulates the simple discovery protocol packets, the simple discovery protocol packet is stored in a payload portion of the IP datagram and the destination address of the IP datagram contained in a header of the IP datagram is populated with an internet protocol address of the management server 120. The present disclosure teaches the receipt of internet protocol packets by the management server 120 from a bridging device 142 and, after authorization is determined, transmission of the packets to the internet protocol address of a bridging device 152 associated with a destination media local area network 150.

The management application 120 receives, processes, and selectively forwards traffic transmitted by bridging devices 142, 152 on different media local area networks 140, 150. The management application 120 reads the internet protocol address of the bridging device 142 sending the message. The management application 120 may remove internet protocol header portions of the message forwarded by the sending bridging device 142. The management application 120 may examine stored tables 132, 134 describing approved communication links that terminals 144, 146 within the first media local area network 140 may have with the second or destination media local area network 150. When the management application 120 determines that terminals 144, 146 in the first media local area network 140 are authorized to transmit data to the second media local area network 150, the management application 120 accesses the internet protocol address of the destination bridging device 152 for the second media local area network 150. The management application 120 encapsulates the simple service discovery protocol packet into a payload portion of an internet protocol packet. The destination address in the internet protocol packet is populated with the internet protocol address of the destination bridging device 152. The management application 120 then sends the packet to the destination bridging device 152. Upon receiving the packet, the bridging device 152 removes the internet protocol header. The simple service discovery protocol packet encapsulated in the IP datagram payload may designate the destination terminal 154 as the intended recipient as directed by the sending terminal 144. The bridging device 152 then broadcasts the simple discovery protocol packet within the media local area network 150 whereupon the destination terminal 154 takes possession of the message.

The management application 120 builds tables 132, 134 defining filtering rules that describe authorized transmissions of data from terminals 144, 146 to media local area networks 150. The associations may be authorized and prearranged by administrators or parties with authority over media local area networks 140, 150. The management application 120 consults the tables 132, 134 to determine approved associations when it receives messages originated on the media local area network 140 and received from the bridging device 142 intended for a different media local area network 150. The tables 132, 134 also may describe authorized transmissions between different media local area networks 140, 150.

The management application 120 comprises the receiving component 122 that receives messages from the bridging devices 142, 152 using the internet protocol. The bridging device 142 resides on media local area network 140 and may forward all traffic originated by terminals 144, 146. In an embodiment, terminals 144, 146 generating messages to a different media local area network 150 create and broadcast within the media local area network 140 a simple service discovery protocol packet with the agreed default multicast internet protocol address 239.255.255.250. In another embodiment, however, a different special default multicast internet address other than 239.255.255.250 may be used. The bridging device 142 on the media local area network 140 of the originating terminal 144, 146 receives this packet. The bridging device 142 encapsulates the simple service discovery protocol packet into another packet with the internet protocol address of the management server 110 and forwards it to the management server 110. The bridging device 142 performs a forwarding function and may not distinguish between local traffic to remain within the media local area network 140 and traffic intended for a different media local area network 150. The bridging device 142 by default may forward to the management server 110 any packet broadcasted within the media local area network 140 regardless of the identity or location of the intended recipient. The bridging device 142 by default may append the internet protocol address of the management server 110 to every simple service discovery protocol received and forward it on.

The receiving component 122 of the management application 120 takes delivery of the internet protocol packet sent by the bridging device 142. The receiving component 122 at this point may not recognize that the packet contains data originally transmitted using the simple service discovery protocol and destined for another media local area network 150. The management server 110 and its components may only send and receive traffic transmitted using the internet protocol. The management server 110 may not "understand" the simple service discovery protocol except to recognize that its presence inside of a packet indicates that the packet forwarding functionality of the management application 120 may be invoked. The management server 110 may perform a plurality of functions unrelated to the present disclosure and it may receive internet protocol packets from a plurality of sending devices located on the network 190 and beyond that are unaware of the activities of the components of the system 100.

When the receiving component 122 takes delivery of internet protocol packets sent by bridging devices 142, 152, it removes a header portion of the internet protocol packet that contains the internet protocol address of the sending bridging device 142, 152. The receiving component 122 may determine by further examining the sender's internet protocol address that the sender is a bridging device 142, 152, one of whose primary functions is to forward traffic. The receiving component 122 then further examines the packet to examine other addressing, instructions, and data payloads that are typically found within internet protocol packets passing between components on the network 190. The present disclosure teaches the receiving component 122 having the functionality to recognize that the packet received from the bridging device 142, 152 contains a data payload or media originally transmitted using the simple service discovery protocol.

Having earlier determined that the packet was received from the bridging device 142, 152 and recognizing that the encapsulated media was originally transmitted using the simple service discovery protocol, the receiving component 122 determines that the final destination of the packet will be on a different media local area network 140, 150 from that which the packet originated. The receiving component 122 may have access to a table or list of internet protocol addresses of bridging devices 142, 152, 162, 172. When the receiving component 122 receives at least one packet from one of these recognized internet protocol addresses, the receiving component 122 may determine that the packet may be routable across the boundaries of media local area networks 140, 150, 160, 170 and hence suggest involvement of additional components of the management application 120.

The management application 120 also comprises the verification component 124 that determines when passage of data from originating terminals 144, 146 on one media local area network 140 to different media local area networks 150, 160, 170 is authorized and may proceed. Terminals 144, 146 within a single media local area network 140 communicate directly with each other using the simple service discovery protocol. The terminals 144, 146 cannot communicate directly with terminals 154, 156 on different media local area networks 150 that in the same manner communicate among themselves using the simple service discovery protocol within their own media local area network 150. The present disclosure teaches a bridging system and methods that promote inter-media local area network communication by encapsulating simple service discovery protocol packets inside internet protocol packets and transmitting the internet protocol packets between the bridging devices 142, 152 resident on the media local area networks 140, 150, respectively. Authorization for transmission of data from terminals 144, 146 to different media local area networks 150, 160, 170 is configured, documented, and stored in tables 132, 134 in the database 130 associated with the management server 110. The verification component 124 consults the tables 132, 134 and makes determinations about the permitted transmissions of data from terminals 144, 146 to different media local area networks 150, 160, 170.

When the receiving component 122 determines by examining the content of an incoming packet that the media or data payload of the packet was originated using the simple service discovery protocol and/or reads some other code or indication that the packet is to be forwarded to a different bridging device 152, the verification component 124 may be alerted to further process the packet. The packet, in addition to containing the data, may also contain information about the destination terminal 154 for the packet. While terminals 144, 146, 154, 156 may not have internet protocol addresses, the present disclosure teaches that they may have names or other identification that can be used in association with the naming or numbering of their the media local area networks 140, 150 to create terminal identifiers that uniquely identify the terminals 144, 146, 154, 156. For example, the terminal 144 residing on the media local area network 140 could have a terminal identifier of 140144, and the terminal 154 residing on the media local area network 150 could have a terminal identifier of 150154.

The verification component 124 may activate upon receiving an alert or other notification that an internet protocol packet has been received from an address that may involve traffic crossing boundaries of media local area networks 140, 150. The verification component 124 receives the packet from the receiving component 122 and consults the table 132 stored in the database 130. The verification component 124 seeks to determine if the terminal 144 has been authorized to send data to the media local area network 150. The verification component 124 may determine that the terminal 144 is authorized to send media to the media local area network 150. The table 132 may contain mappings terminals 144 to a plurality of media local area networks 150, 160, 170. The mappings may be placed in the table 132 by administrators or other parties with authority over the media local area networks 140, 150. The mappings may be placed prior to the transmitting terminal 144 multicasting data that may be forwarded across borders of media local area networks 140, 150.

The present disclosure also teaches the transmission of media from terminals 144 wherein there is more than one destination media local area network 150, 160, 170. The originating terminal 144 may indicate more than one destination media local area network 150, 160, 170 in its simple service discovery protocol packet and the verification component 124 may detect that there is more than one destination media local area network 150, 160, 170 when it examines the packet. In this case, the table 132 may contain an entry showing the media local area network 150, 160, 170 as both jointly and severally authorized destinations for data originated by the terminal 144.

Methods are taught herein that may be invoked if the verification component 124 determines that a mapping currently does not exist between a sending terminal 144 and the destination media local area network 150, 160, 170. In this event, the data may not be forwarded. The message simply may be dropped by the management server 110.

If the verification component 124 determines that an active table mapping exists that maps the sending terminal 144 to the destination media local area network 150, this indicates that the packet may be forwarded on to the bridging device 152 of the media local area network 150. The verification component 124 may prepare instructions for forwarding the packet to the bridging device 152 that will in turn broadcast the packet within the media local area network 150 for capture by the terminal 154.

The management application 120 also comprises the transmission component 126 that encapsulates the original simple service discovery protocol message into a new internet protocol packet. The new internet protocol packet is provided the destination internet protocol address of the bridging device 152 associated with the destination media local area network 150. This action occurs after the verification component 124 has determined from examining the table 132 that data multicasted by the terminal 144 may be sent to the media local area network 150. After the transmission component 126 has created the new packet with the internet protocol address of the bridging device 152, it then sends the packet to the bridging device 152. The packet may contain encapsulated information identifying the intended destination terminal 154. When the bridging device 152 receives the internet protocol packet from the management server 110, the bridging device 152 then wirelessly broadcasts the packet within the media local area network 150 whereupon the terminal 154 recognizes and takes possession of the packet.

The management application 120 also comprises the mapping component 128 that builds the tables 132, 134 containing listings of terminals 144, 154 that may be authorized to transmit data across the boundaries of their resident media local area networks 140, 150, respectively. As the management server 110 receives messages forwarded by bridging devices 142, 152, 162, 172, the management application 120 learns about the identities, functions, locations, and interactions of the terminals 144, 154. The mapping component 128 over time builds lists of the media local area networks 140, 150, their terminals 144, 154, and their bridging devices 142, 152. As the management application 120 receives a plurality of internet protocol messages from bridging devices 142, 152, 162, 172 containing encapsulated data originally transmitted using the simple service discovery protocol, the management application 120 may gather information about, create listings of, and build intelligence about the identities and functionalities of the terminals 144, 146, 154, 156, 164, 166, 174, 176. The management application 120, based on the information received, may infer topologies or structures of media local area networks 140, 150, 160, 170.

The mapping component 128 builds the tables 132, 134 and documents the authorized linkages between sending terminals 144 and destination media local area networks 150. In some cases, tables 132, 134 may be built that describe permitted associations between media local area networks 140, 150, implying that all terminals 144, 146 on one media local area network 140 are authorized to transmit data to all terminals 154, 156 on another media local area network 150. Transmission of data in practice would be limited by the functionalities of the terminals 144, 146, 154, 156 originating and receiving the packets. For example, an electronic picture frame appliance would not typically originate data for transmission to a household kitchen appliance. As a supplement to or as an alternative to tables 132, 134 that may describe associations between media local area networks 140, 150 only, the management application 120 may use filtering rules.

The mapping component 128 may build tables of associations of terminals 144 with different media local area networks 150 based on instructions received from parties with administrative authority over the media local area networks 140, 150. The present disclosure teaches the management server 110 providing an interface that administrators may use to authorize associations. The management application 120 through the mapping component 128 may provide a graphical user interface that administrators or other parties with the requisite permissions may access to configure permitted associations and filtering rules. The graphical user interface may be a web interface. The interface may allow the simple dragging or movement of icons representing terminals 144, 154 and media local area network 150, 160, 170 to authorize transmission of data.

Media local area networks 140, 150, 160, 170 are local area networks populated by terminals 144, 146, 154, 156, 164, 166, 174, 176 that multicast messages using the simple service discovery protocol. Media local area networks 140, 150, 160, 170 may be home networks comprising primarily consumer electronic devices or may be small office/home office (SOHO) networks.

Bridging devices 142, 152, 162, 172 are associated with media local area networks 140, 150, 160, 170, respectively, and forward messages multicasted by the terminals 144, 146, 154, 156, 164, 166, 174, 176 on their respective media local area networks 140, 150, 160, 170. The bridging devices 142, 152, 162, 172 may forward all packets received in internal multicasts to the management server 110 regardless of whether the packets are intended for local terminals 144, 146 or are intended for other media local area networks 140, 150. Bridging devices 142, 152, 162, 172 may be computer systems with processor, memory, radio transceiver circuitry, and installed network adapter cards or embedded network adapter circuitry that may perform a plurality of functions in addition to forwarding packets to the management server 110. Bridging devices 142, 152, 162, 172 may be network devices such as routers or switches. In an embodiment, bridging devices 142, 152, 162, 172 may only perform the tasks of receiving multicast packets, encapsulating the packets into internet protocol packets with the internet protocol address of the management server 110, and forwarding the packets to the management server 110. Bridging devices 142, 152, 162, 172 are configured with internet protocol addresses that are visible to stations outside of the respective media local area networks 140, 150, 160, 170 of the bridging devices 142, 152, 162, 172. Bridging devices 142, 152, 162, 172 may communicate with the management server 110 using wired links. Bridging devices 142, 152, 162, 172 may communicate wirelessly with the terminals 144, 146, 154, 156, 164, 166, 174, 176 in their respective media local area networks 140, 150, 160, 170.

In an embodiment, the media local area network 140, the media local area network 150, the media local area network 160, and the media local area network 170 may be referred to as the first media local area network 140, the second media local area network 150, the third media local area network 160, and the fourth media local area network 170, respectively. In an embodiment, the bridging devices 142, 152, 162, 172 may be referred to as the first bridging device 142, the second bridging device 152, the third bridging device 162, and the fourth bridging device 172.

Terminals 144, 146, 154, 156, 164, 166, 174, 176 reside on media local area networks 140, 150, 160, 170 and broadcast packets using the simple service discovery protocol with the default address of 239.255.255.250. When a terminal 144 activates, it may send an initial multicast message announcing its activation. After activation, the terminal 144 may send periodic messages comprising reminder notifications of its presence. When a terminal 144 experiences an event of some kind, it may also multicast an announcement of the event. Terminals 144, 146, 154, 156, 164, 166, 174, 176 may comprise a desktop computer device type, a laptop computer device type, a printer device type, a wireless access point device type, a stereo system device type, a television device type, a set-top box device type, a digital versatile disc (DVD) player device type, a media player device type, a refrigerator device type, a range device type, a heating, ventilation, and air conditioning (HVAC) controller device type, a toaster device type, a microwave oven device type, a range device type, a garage door opener device type, a grill device type, a hot tub controller device type, a dishwasher device type, a clothes washing machine device type, a clothes dryer device type, and a freezer device type.

In an example illustrating some of the bridging and filtering functionality taught by the present disclosure, an extended family with family members residing in a plurality of geographic locations may use media local area networks 140, 150 and the functionality of the management server 110 between them to share electronic content. A couple with grandchildren may own a picture frame device and a television in their home and those devices may be connected to a media local area network 150 installed in their home. In this example, the picture frame device and the television may be terminals 154, 156, respectively. The grandchildren in this example may reside in a different home from the grandparents. The grandchildren's home may operate devices that are terminals 144, 146 on the media local area network 140. When the grandchildren wish to send digital photographs and video content of the grandchildren's sports or theatrical activities, for instance, to the grandparents, the terminals 144, 146 may initiate simple service discovery protocol multicasts within the grandchildren's media local area network 140. The content contained in the simple service discovery protocol multicasts may identify the grandparents' media local area network 150 and terminals 154, 156 as the destination for the packets. The bridging device 142 on the media local area network 140 will receive the simple service discovery protocol multicast packets from the terminals 144, 146, encapsulate the multicast packets into internet protocol (IP) packets and forward the packets to the management server 110. The bridging device 142 may be one of many devices on the media local area network 140 and may engage in a plurality of functions besides receiving multicast simple service discovery protocol from terminals 144, 146, encapsulating the packets in internet protocol (IP) packets, and forwarding them to the management server 110. The bridging device 142, for example, may be a personal computer used by the grandchildren's family for a plurality of applications.

When the management server 110, that likely may be physically located not proximate the home of the grandchildren, receives the internet protocol packets from the bridging device 142, the receiving component 122 and the verification component 124 present and/or store the internet protocol packets, decapsulate, and analyze the content of the packets. The verification component 124 then may consult the table 132 in the database 130 to determine if a mapping is in place between the media local area network 140 and media local area network 150 and/or between specific terminals 144, 146 and terminals 154, 156 located on the media local area networks 140, 150, respectively. The verification component 124 may perform a filtering function so that not all content sent from the originating or sending media local area network 140 is made available to all terminals 154, 156 on the destination or recipient media local area network 150. The tables 132, 134 are constructed with a plurality of entries and read by the verification component 124 such that some content intended for specific terminals 154, 156 is sent to the media local area network 150 by the management server 110 and then is made available to the terminals 154, 156 on to their media local area network 150 and other content is filtered out by the verification component 124 and not forwarded.

Continuing with this example, once the verification component 124 determines that a mapping is in place between the media local area network 140 and media local area network 150 and/or between specific terminals 144, 146 and terminals 154, 156, the transmission component 126 activates. The transmission component 126 encapsulates the packets into internet protocol packets with the destination address of the bridging device 152 on the grandparents' media local area network 150 and forwards the packets. The bridging device 152 receives the internet protocol packets, removes their internet protocol header information, and multicasts the packets on the media local area network 150 using the simple service discovery protocol. The appropriate terminals 154, 156 recognize the packets as intended for them and present and/or store them. For example, the terminal 154 may be the picture frame device in the grandparents' home and the terminal 156 may be the television in the grandparents' home. The picture frame device would present and/or store the digital photographs sent by the grandchildren and the television would present and/or store the video content sent by the grandchildren. Since digital photographs and video content may be transmitted in differing electronic file types, the picture frame device and the television would each recognize and present and/or store the electronic content intended for it.

The network 180 promotes communication between the components of the system 100. The network 180 may be any communication network including a public data network (PDN), a public switched telephone network (PSTN), a private network, and/or a combination thereof.

Figure 2A:
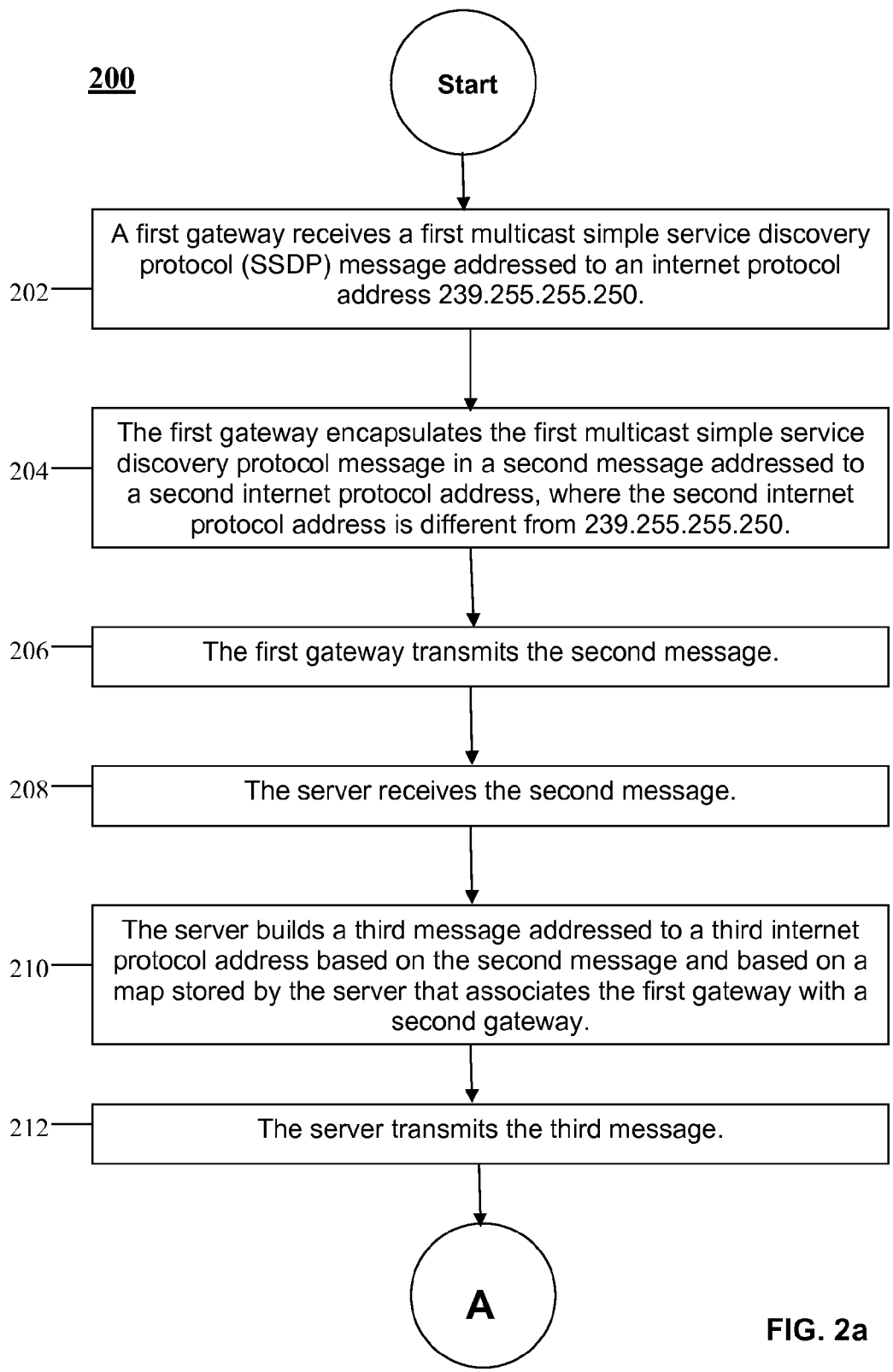
FIG. 2*a* is a flow chart illustrating a method according to an embodiment of the disclosure.
Figure 2B:
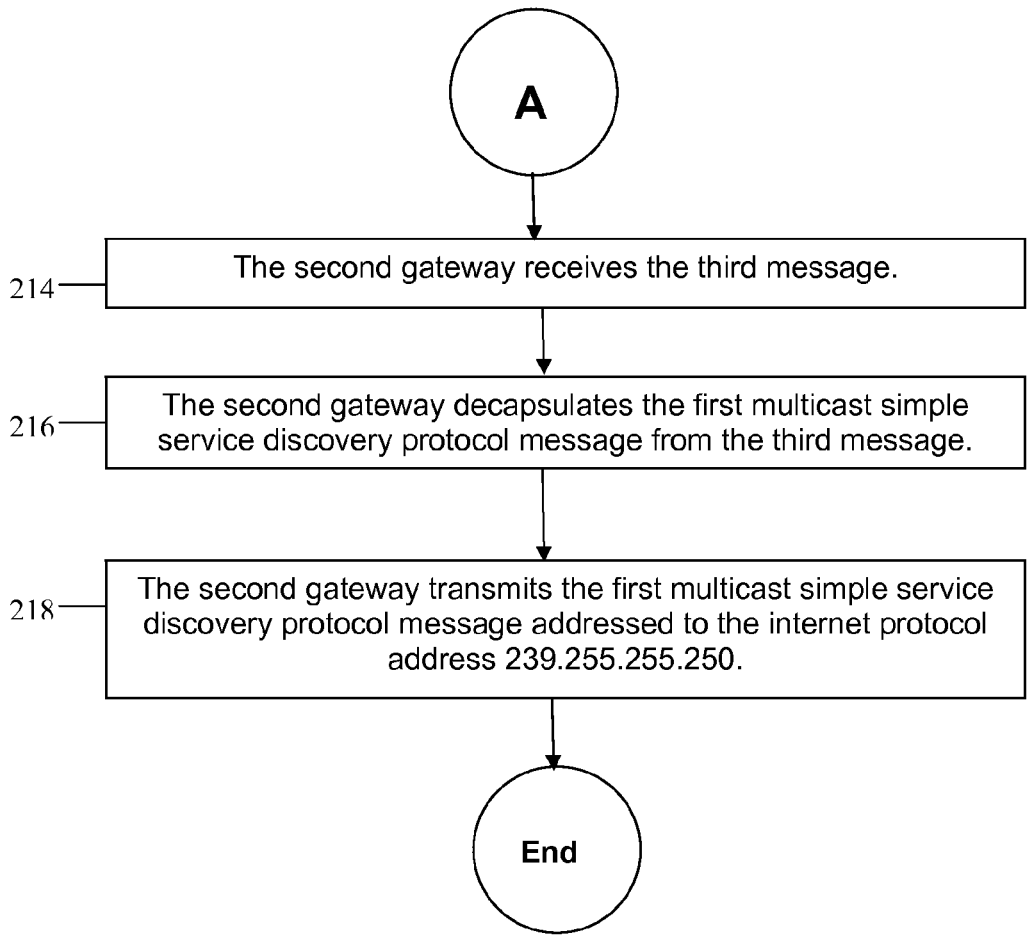
FIG. 2*b* is a flow chart illustrating a method according to an embodiment of the disclosure.

Turning now to FIG. 2a and FIG. 2b, a processor-implemented method 200 of coupling and/or sharing content between media local area networks 140, 150 is provided. Beginning at block 202, a first gateway receives a first multicast simple service discovery protocol message addressed to an internet protocol address that may be a single internet protocol address defined by a standard. In an embodiment, the single internet protocol address may be 239.255.255.250. The first gateway may be the bridging device 142 and the first multicast simple service discovery protocol message may have been originated by the terminal 144 resident on the media local area network 140 with the bridging device 142.

At block 204, the first gateway encapsulates the first multicast simple service discovery protocol message in a second message addressed to a second internet protocol address where the second internet protocol address is different from the single internet protocol address that may be 239.255.255.250. The bridging device 142 may encapsulate the message originated by the terminal 144 into a second message directed to the internet protocol address of the management server 110. The bridging device 142 by default may address and forward every simple service discovery protocol message it receives to the management server 110.

At block 206, the first gateway transmits the second message and at block 208, the server receives the second message. In an embodiment, the receiving component 122 of the management application 120 executing on the management server 110, receives the second message and may recognize the second message as being intended for a final destination not associated with the management server 110.

At block 210, the server builds a third message addressed to a third internet protocol address based on the second message and based on a map stored by the server that associates the first gateway with a second gateway. The second gateway may be the bridging device 152 associated with the media local area network 150 within which the terminal 154 resides. The map stored by the server may be the table 132 in the database 130 that associates the bridging device 142 and the bridging device 152. The third internet protocol address may be the internet protocol address of the bridging device 152. The verification component 124 consults the table 132 to determine that the transmission is authorized. The transmission component 126 of the management application 120 then appends the internet protocol address of the second gateway or bridging device 152 to the third message.

At block 212, the server transmits the third message and at block 214, the second gateway receives the third message. The transmission component 126 sends the packet to the bridging device 152 and the bridging device 152 receives the packet.

At block 216, the second gateway decapsulates the first multicast simple service discovery protocol message from the third message. The bridging device 152, removes internet protocol headers and extracts the data transmitted by the originating terminal 144.

At block 218, the second gateway transmits the first multicast simple service discovery protocol message addressed to the single internet protocol address that may be 239.255.255.250. The bridging device 152 wirelessly broadcasts the message within the media local area network 150. The terminal 154 recognizes the message as of interest to it and/or intended for it. The terminal 154 may recognize the message as of interest based on the file type of the message content. A terminal 154 that electronically displays still pictures may determine that a file with the extension .jpg or .gif may be intended for it and/or may be of interest to it and may capture and present the image(s) contained in the file. A terminal 154 that plays music may determine that a file with the extension .wav is of interest to it and/or intended for it and capture and play the music or other audible content contained in the file. The terminal 154 may recognize the message as of interest to it and/or intended for it based on addressing contained in the message. The addressing may comprise the media access control (MAC) address of the terminal 154 or some other addressing format or identification scheme. The terminal 154 may recognize the message as intended for it based on a naming convention adopted by administrators or others with authority over the media local area networks 140, 150, 160, 170.

Figure 3:
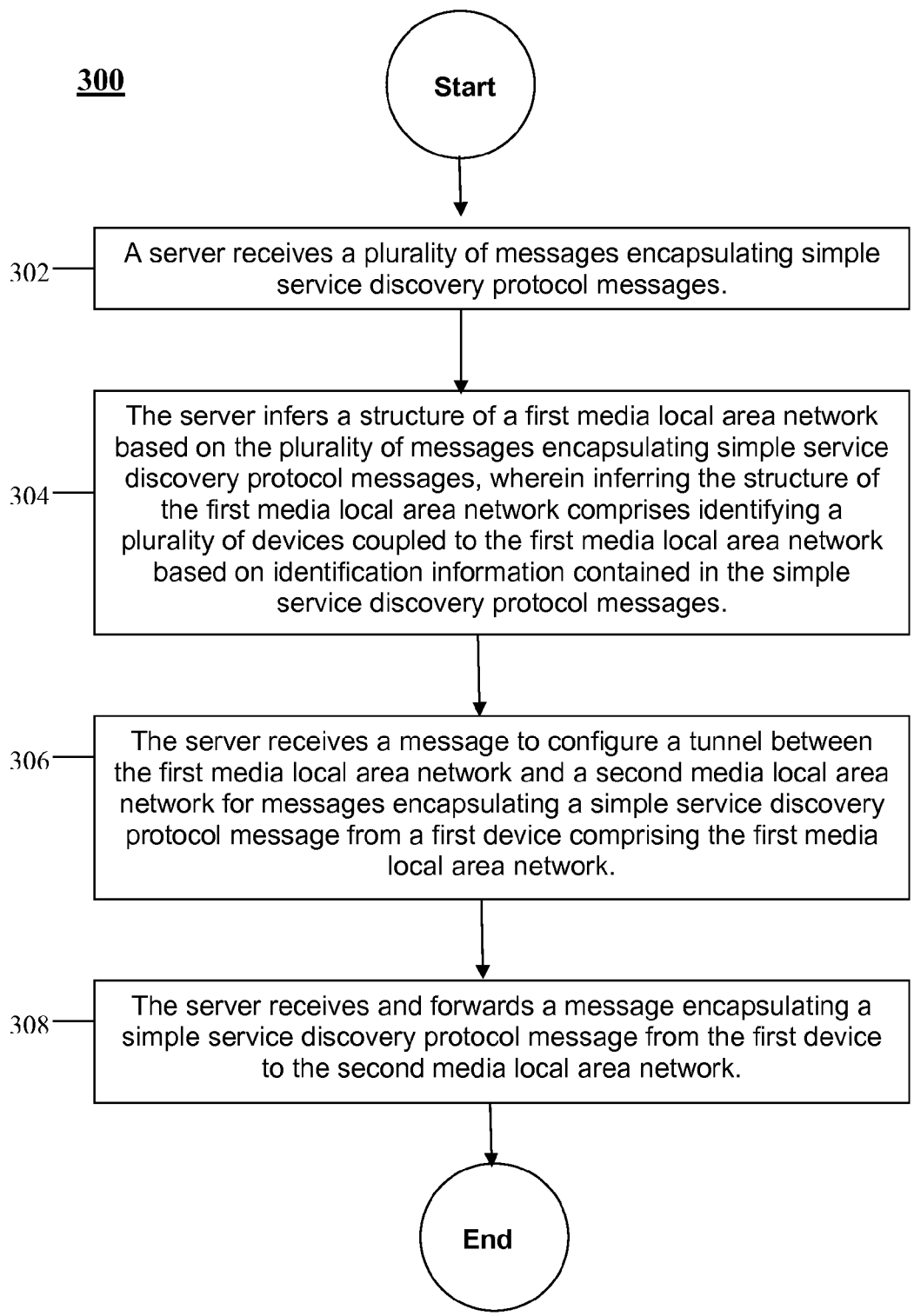
FIG. 3 is a flow chart illustrating a method according to an embodiment of the disclosure.

Turning now to FIG. 3, a processor-implemented method 300 of sharing content between media local area networks is provided. Beginning at block 302, a server receives a plurality of messages encapsulating simple service discovery protocol messages. The management server 110 receives messages from bridging devices 142, 152, 162, 172 that are forwarding simple service discovery protocol messages they have received from terminals 144, 146, 154, 156, 164, 166, 174, 176 in their respective media local area networks 140, 150, 160, 170.

At block 304, the server infers a structure of a first media local area network based on the plurality of messages encapsulating simple service discovery protocol messages. For the server, inferring the structure of the first media local area network comprises identifying a plurality of devices coupled to the first media local area network based on identification information contained in the simple service discovery protocol messages. As the management application 120 of the management server 110 receives, processes, and forwards a plurality of messages from the bridging device 142, the mapping component 128 builds tables 132, 134 containing associations of terminals 144, 146 and infers the structure of the media local area network 140.

Because the bridging device 142 may forward to the management server 110 all messages broadcast on the media local area network 140 and not just messages intended for destinations beyond the media local area network 140, the management application 120 may receive items of information about most or all of the terminals 144, 146 resident on the media local area network 140. This may include information about the functionality of individual terminals 144, 146 as well as the interactions between the terminals 144, 146. Based on receiving a plurality of messages that contain information about the functionality and interactions of the terminals 144, 146, the management server 110 may infer a structure of the media local area network 140. The management server may make inferences about the structure based on associating each terminal 144, 146 in the media local area network 140 with a unique identifier, for example the terminal identifier 140144 for the terminal 144 as proposed above.

At block 306, the server receives a message to configure a tunnel between the first media local area network and a second media local area network. The tunnel is for messages encapsulating a simple service discovery protocol message originated by a first device residing on the first media local area network. The tunnel as taught herein may be a persistent or steady end-to-end connection from a terminal 144 to a different media local area network 150. The tunnel may not be a persistent connection in a literal sense but rather in a figurative or virtual sense wherein specifications defined and remaining in filtering rules or described in the tables 132, 134 provide for a plurality of transmissions of messages between the terminal 144 to the media local area network 150. The tunnel may be configured as a rule directing that messages received by the management server 110 from the bridging device 142 wherein the message encapsulates content originated by the terminal 144 using the simple service discovery protocol are to be forwarded to the bridging device 152. The tunnel may alternatively be configured for a single transmission between the terminal 144 and the media local area network 150 wherein information regarding the configuration of the tunnel is discarded after the single transmission is completed.

At block 308, the server receives and forwards a message encapsulating a simple service discovery protocol message from the first device to the second media local area network. The management server 110 receives an internet protocol message from the bridging device 142 encapsulating a simple service discovery protocol message originated by the terminal 144 indicated. The management application 120 determines that the tunnel described at block 308 is in effect wherein the traffic may pass from the terminal 144 to the media local area network 150. The management application 120 encapsulates the message into a message with the internet protocol address of the bridging device 152 as the destination address and transmits the message. When the bridging device 152 receives the message, the bridging device 152 wirelessly broadcasts the message on the media local area network 150 whereupon the terminal 154 recognizes that it is the intended recipient and takes possession of the message.

Figure 4:
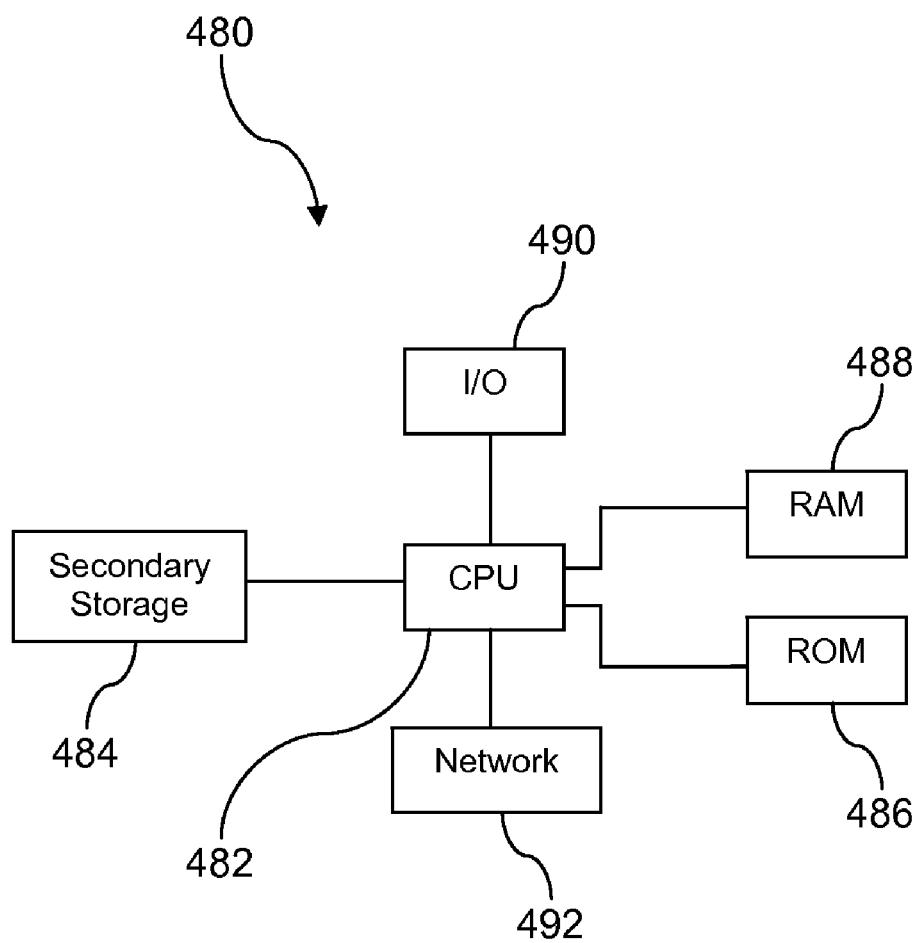
FIG. 4 illustrates an exemplary computer system suitable for implementing some aspects of the several embodiments of the disclosure.

FIG. 4 illustrates a computer system 480 suitable for implementing one or more embodiments disclosed herein. The computer system 480 includes a processor 482 (which may be referred to as a central processor unit or CPU) that is in communication with memory devices including secondary storage 484, read only memory (ROM) 486, random access memory (RAM) 488, input/output (I/O) devices 490, and network connectivity devices 492. The processor 482 may be implemented as one or more CPU chips.

It is understood that by programming and/or loading executable instructions onto the computer system 480, at least one of the CPU 482, the RAM 488, and the ROM 486 are changed, transforming the computer system 480 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 484 is typically comprised of one or more disk drives or tape drives and is used for non-volatile storage of data and as an over-flow data storage device if RAM 488 is not large enough to hold all working data. Secondary storage 484 may be used to store programs which are loaded into RAM 488 when such programs are selected for execution. The ROM 486 is used to store instructions and perhaps data which are read during program execution. ROM 486 is a non-volatile memory device which typically has a small memory capacity relative to the larger memory capacity of secondary storage 484. The RAM 488 is used to store volatile data and perhaps to store instructions. Access to both ROM 486 and RAM 488 is typically faster than to secondary storage 484.

I/O devices 490 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 492 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 492 may enable the processor 482 to communicate with an Internet or one or more intranets. With such a network connection, it is contemplated that the processor 482 might receive information from the network, or might output information to the network in the course of performing the above-described method steps. Such information, which is often represented as a sequence of instructions to be executed using processor 482, may be received from and outputted to the network, for example, in the form of a computer data signal embodied in a carrier wave.

Such information, which may include data or instructions to be executed using processor 482 for example, may be received from and outputted to the network, for example, in the form of a computer data baseband signal or signal embodied in a carrier wave. The baseband signal or signal embodied in the carrier wave generated by the network connectivity devices 492 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art.

The processor 482 executes instructions, codes, computer programs, scripts which it accesses from hard disk, floppy disk, optical disk (these various disk based systems may all be considered secondary storage 484), ROM 486, RAM 488, or the network connectivity devices 492. While only one processor 482 is shown, multiple processors may be present. Thus, while instructions may be discussed as executed by a processor, the instructions may be executed simultaneously, serially, or otherwise executed by one or multiple processors.

In an embodiment, the computer system 480 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 480 to provide the functionality of a number of servers that is not directly bound to the number of computers in the computer system 480. For example, virtualization software may provide 20 virtual servers on 4 physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 480, at least portions of the contents of the computer program product to the secondary storage 484, to the ROM 486, to the RAM 488, and/or to other non-volatile memory and volatile memory of the computer system 480. The processor 482 may process the executable instructions and/or data in part by directly accessing the computer program product, for example by reading from a CD-ROM disk inserted into a disk drive peripheral of the computer system 480. The computer program product may comprise instructions that promote the loading and/or copying of data, data structures, files, and/or executable instructions to the secondary storage 484, to the ROM 486, to the RAM 488, and/or to other non-volatile memory and volatile memory of the computer system 480.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system, comprising:
a first bridging device associated with a first internet protocol (IP) address having a radio transceiver that
receives simple service discovery protocol (SSDP) messages from a plurality of devices on a first media local area network (LAN),
encapsulates the simple service discovery protocol messages in messages directed to a second internet protocol address, and
transmits the messages;
a server associated with the second internet protocol address that receives the messages from the first bridging device,
based on the messages received from the first bridging device, constructs a list of the plurality of devices on the first media local area network, and
based on a first filtering rule configured into the server, forwards at least some of the messages received from the first bridging device to a third internet protocol address; and
a second bridging device associated with the third internet protocol address having a radio transceiver that
receives the messages forwarded by the server to the third internet protocol address,
decapsulates the simple service discovery messages encapsulated in the messages forwarded by the server, and
wirelessly broadcasts the simple service discovery protocol messages to a plurality of devices on a second media local area network.

2. The system of claim 1, wherein
the second bridging device
receives simple service discovery protocol messages from the plurality of devices on the second media local area network,
encapsulates the simple service discovery protocol messages received from the second media local area network in messages directed to the second internet protocol address, and
transmits the messages; and
the server
receives the messages from the second bridging device and
based on the messages received from the second bridging device, constructs a list of the plurality of devices on the second media local area network.

3. The system of claim 1, wherein the simple service discovery protocol messages from the plurality of devices on the first media local area network comprise identification of the devices.

4. The system of claim 3, wherein the identification comprises an indication of the type of device.

5. The system of claim 4, wherein the type of device comprises a computer device type, a television device type, a media player device type, a gaming device type, a refrigerator device type, a range device type, an air handling device type, a dish washer device type, a clothes washing machine device type, a clothes dryer device type, and a freezer device type.

6. The system of claim 1, wherein the first bridging device communicates with the server via a wired link.

7. The system of claim 1, wherein the second bridging device communicates with the server via a wired link.

8. The system of claim 1, wherein the server provides an interface for configuring the first filtering rule.

9. The system of claim 1, further comprising:
a third bridging device associated with a third internet protocol (IP) address having a radio transceiver that
receives simple service discovery protocol (SSDP) messages from a plurality of devices on a third media local area network (LAN),
encapsulates the simple service discovery protocol messages in messages directed to the second internet protocol address, and
transmits the messages;
wherein the server
receives the messages from the third bridging device,
based on the messages received from the third bridging device, constructs a list of the plurality of devices on the third media local area network, and
based on a second filtering rule configured into the server, forwards at least some of the messages received from the third bridging device to a fifth internet protocol address; and
further comprising a fourth bridging device associated with the fifth internet protocol address having a radio transceiver that
receives the messages forwarded by the server to the fifth internet protocol address,
decapsulates the simple service discovery messages encapsulated in the messages forwarded by the server, and
wirelessly broadcasts the simple service discovery protocol messages to a plurality of devices on a fourth media local area network.

10. A processor-implemented method of coupling two media local area networks, comprising:
a first gateway receiving a first multicast simple service discovery protocol (SSDP) message addressed to a single internet protocol address defined by a standard;
the first gateway encapsulating the first multicast simple service discovery protocol message in a second message addressed to a second internet protocol address, where the second internet protocol address is different from the single internet protocol address defined by the standard;
the first gateway transmitting the second message;
a server receiving the second message;
the server building a third message addressed to a third internet protocol address based on the second message and based on a map stored by the server that associates the first gateway with a second gateway;
the server transmitting the third message;
the second gateway receiving the third message;
the second gateway decapsulating the first multicast simple service discovery protocol message from the third message; and
the second gateway transmitting the first multicast simple service discovery protocol message addressed to the single internet protocol address defined by the standard.

11. The method of claim 10, further comprising receiving input defining the map stored by the server, wherein the map defines a tunnel from a first device associated with the first gateway to a second device associated with the second gateway.

12. The method of claim 10, wherein the first multicast simple service discovery protocol message comprises a media content and wherein the media content comprises at least a portion of a digital picture file, a video file, and an audio file.

13. The method of claim 12, wherein the single internet protocol address defined by the standard is 239.255.255.250.

14. The method of claim 10, wherein the first gateway is a member of a first media local area network and the second gateway is a member of a second media local area network.

15. The method of claim 10, further comprising the server inferring a topology of a first media local area network associated with the first gateway.

16. The method of claim 15, wherein the server infers the topology of the first media local area network based on a plurality of messages sent to the server by the first gateway, each message encapsulating a simple service discovery protocol message.

17. The method of claim 15, wherein the simple service discovery protocol messages comprise information uniquely identifying a plurality of devices comprising the first media local area network.

18. A processor-implemented method of sharing content between local area networks, comprising:

a server receiving a plurality of messages encapsulating simple service discovery protocol messages;

the server inferring a structure of a first media local area network based on the plurality of messages encapsulating simple service discovery protocol messages, wherein inferring the structure of the first media local area network comprises identifying a plurality of devices coupled to the first media local area network based on identification information contained in the simple service discovery protocol messages;

the server receiving a message to configure a tunnel between the first media local area network and a second media local area network for messages encapsulating a simple service discovery protocol message from a first device comprising the first media local area network the server receiving and forwarding a message encapsulating a simple service discovery protocol message from the first device to the second media local area network.

19. The method of claim 18, wherein the server inferring the structure of the first media local area network is based at least in part on associating each device coupled to the first media local area network with a unique identifier.

20. The method of claim 18, wherein the server inferring the structure of the first media local area network is based at least in part on associating each device coupled to the first local area network with a device type.

* * * * *